US012152782B2

(12) United States Patent
Brunner et al.

(10) Patent No.: US 12,152,782 B2
(45) Date of Patent: Nov. 26, 2024

(54) COOKING APPLIANCE HAVING A SPECIFIC DOOR-OPENING DEVICE FOR THE AUTOMATIC PIVOTING OF A RETRACTABLE DOOR OF THE COOKING APPLIANCE, AND METHOD

(71) Applicant: BSH Hausgeräte GmbH, Munich (DE)

(72) Inventors: Martin Brunner, Pforzheim (DE); Bortolo Inserra, Bruchsal (DE); Daniel Hausner, Bretten (DE)

(73) Assignee: BSH Hausgeräte GmbH, Munich (DE)

( * ) Notice: Subject to any disclaimer, the term of this patent is extended or adjusted under 35 U.S.C. 154(b) by 403 days.

(21) Appl. No.: 17/637,846

(22) PCT Filed: Aug. 25, 2020

(86) PCT No.: PCT/EP2020/073689

§ 371 (c)(1),
(2) Date: Feb. 24, 2022

(87) PCT Pub. No.: WO2021/043620

PCT Pub. Date: Mar. 11, 2021

(65) Prior Publication Data

US 2022/0275947 A1 Sep. 1, 2022

(30) Foreign Application Priority Data

Sep. 5, 2019 (DE) ..................... 10 2019 213 486.6

(51) Int. Cl.
*F24C 15/02* (2006.01)
*E05D 15/58* (2006.01)
*E05F 15/638* (2015.01)

(52) U.S. Cl.
CPC .......... *F24C 15/026* (2013.01); *E05D 15/581* (2013.01); *E05F 15/638* (2015.01);
(Continued)

(58) Field of Classification Search
CPC .... F24C 15/023; F24C 15/026; E05D 15/581; E05D 15/638; E05D 2015/586
(Continued)

(56) References Cited

U.S. PATENT DOCUMENTS 3,009,458 A * 11/1961 Pearce .................. A47B 96/16 49/108
4,726,352 A * 2/1988 Radke .................. F24C 15/026 126/190
(Continued)

FOREIGN PATENT DOCUMENTS

DE 102018201949 A1 8/2019
JP 4393388 B2 1/2010

OTHER PUBLICATIONS

National Search Report DE 10 2019 213 486.6 dated Apr. 7, 2020.
International Search Report PCT EP2020/073689 dated Nov. 3, 2020.

*Primary Examiner* — Vivek K Shirsat
(74) *Attorney, Agent, or Firm* — Michael E. Tschupp; Andre Pallapies; Brandon G. Braun

(57) ABSTRACT

A cooking appliance includes a door for closing a cooking compartment and a guide device which guides the door when moving into and out of a stowage compartment and includes a guide track in a stowage-compartment delimiting wall and a guide carriage connected to the door and including a guide runner guided in the guide track and connected to a connecting rod of the guide carriage. A door-opening device automatically moves the door between closed and open positions and includes a coupling rod which is mechanically coupled directly to the connecting rod such as to permit a relative movement between the coupling rod and the connecting rod, and which is mounted for rotation about an axis of rotation oriented in a heightwise direction so that, when the coupling rod is pivoted about the axis of rotation,
(Continued)

the connecting rod is carried along in a depthwise direction of the cooking appliance.

14 Claims, 8 Drawing Sheets

(52) U.S. Cl.
CPC ....... *F24C 15/023* (2013.01); *E05Y 2201/434* (2013.01); *E05Y 2201/64* (2013.01); *E05Y 2201/684* (2013.01); *E05Y 2201/686* (2013.01); *E05Y 2800/102* (2013.01); *E05Y 2900/308* (2013.01)

(58) Field of Classification Search
USPC .................. 126/191, 197, 192, 194; 312/322
See application file for complete search history.

(56) References Cited

U.S. PATENT DOCUMENTS

| | | | |
|---|---|---|---|
| 2019/0271474 | A1 | 9/2019 | Grobleben |
| 2021/0116133 | A1 | 4/2021 | Alt |

* cited by examiner

COOKING APPLIANCE HAVING A SPECIFIC DOOR-OPENING DEVICE FOR THE AUTOMATIC PIVOTING OF A RETRACTABLE DOOR OF THE COOKING APPLIANCE, AND METHOD

CROSS-REFERENCES TO RELATED APPLICATIONS

This application is the U.S. National Stage of International Application No. PCT/EP2020/073689, filed Aug. 25, 2020, which designated the United States and has been published as International Publication No. WO 2021/043620 A1 and which claims the priority of German Patent Application, Serial No. 10 2019 213 486.6, filed Sep. 3, 2019, pursuant to 35 U.S.C. 119 (a)-(d).

The contents of International Application No. PCT/EP2020/073689 and German Patent Application, Serial No. 10 2019 213 486.6 are incorporated herein by reference in their entireties as if fully set forth herein.

BACKGROUND OF THE INVENTION

One aspect of the invention relates to a cooking appliance having a door for closing a cooking compartment. The cooking appliance has a stowage compartment. The door can be retracted into this stowage compartment. The stowage compartment is embodied in a housing of the cooking appliance. When being moved into the stowage compartment or out of the stowage compartment, the door is guided by a guide device of the cooking appliance. The guide device has at least one guide track. This guide track is embodied in a wall which delimits the stowage compartment. Furthermore, the guide device has a guide carriage with a guide runner. The guide runner is guided in the guide track. The guide carriage is connected to the door. The guide runner is connected to a connecting rod of the guide carriage. Furthermore, the cooking appliance has a door-opening device for automatic movement of the door at least in certain regions over an entire movement path measured between a closed and an open position of the door.

Embodiments of cooking appliances in which a door is moved automatically at least in certain regions on its movement path by a door-opening device are known. A cooking appliance of this type is known, for example, from DE 10 2015 226 009 A1. The door-opening device there has a motor. Furthermore, the door-opening device is embodied with a vertically oriented lifting rod. This is coupled to the motor. The lifting rod is in turn coupled to two cable pulls, which are connected to a drag lever. This drag lever is coupled to a hinge arm of a hinge, which is embodied to pivot the door.

Such an embodiment of a door-opening device is relatively complex. Provision is made for different components which must be coupled together. This applies in particular to the flexible cable pulls on the one hand and to the lifting rod, which is in itself rigid, on the other hand. Furthermore, these individual components must also be coupled and oriented in different spatial directions.

BRIEF SUMMARY OF THE INVENTION

It is the object of the present invention to create a cooking appliance and a method in which or with which the automatic guidance at least in certain regions of a retractable door is improved.

This object is achieved by a cooking appliance and a method as claimed in the independent claims.

One aspect of the invention relates to a cooking appliance having a door for closing a cooking compartment. The cooking appliance has a stowage compartment. This stowage compartment is embodied in a housing of the cooking appliance. The door can be retracted into this stowage compartment. When being moved into the stowage compartment and/or out of the stowage compartment, the door is guided by a guide device of the cooking appliance. The guide device has at least one guide track. The guide track is embodied in a wall which delimits the stowage compartment. Furthermore, the guide device has at least one guide carriage. The guide carriage has at least one guide runner. The guide carriage is connected to the door. The guide runner is furthermore connected to a connecting rod of the guide carriage. The guide runner is guided in this guide track. Furthermore, the cooking appliance has a door-opening device. The door-opening device embodies an automatic movement of the door at least in certain regions over an entire movement path measured between a closed and an open position of the door. The door-opening device has a coupling rod, which on the one hand is mechanically coupled directly to the connecting rod of the guide carriage so that relative movement between the coupling rod and the connecting rod is made possible. Furthermore, the coupling rod is mounted such that it can be rotated about an axis of rotation oriented in the heightwise direction of the cooking appliance. When the coupling rod is pivoted about this axis of rotation, the connecting rod is carried along in the depthwise direction of the cooking appliance. With such an embodiment of the door-opening device, on the one hand an embodiment with a reduced number of components is achieved. The complexity of the operating principle is reduced. Because there is no longer a need for a cable pull in this embodiment, the movement transmission can also take place in a more direct and precise manner. In particular, the coupling rod is coupled directly to specific components of the guide device. This coupling between the connecting rod and the coupling rod is such that the two components can also move relative to one another.

By the coupling rod being mounted rotatably at the opposite end with a specifically oriented axis of rotation, a very specific pivoting movement of this coupling rod is also achieved. In particular, the coupling rod now pivots only in one plane, in particular a horizontal plane.

With this embodiment, the concept of the door-opening device is also made possible in a highly space-saving manner.

In one advantageous embodiment, it is provided that the coupling rod is rotatably mounted with a rear end, when viewed in the depthwise direction of the cooking appliance, on a base wall which delimits the stowage compartment. With such an embodiment, the pivot point can also be mounted on a stable component. In this context, the base wall is part of a base assembly of the cooking appliance. It is therefore highly stable in itself and formed to receive greater weight forces and bearing forces. It is therefore advantageous in this regard for the pivot bearing to be formed in this base wall. Particularly when correspondingly greater lever forces arise via the coupling rod on account of the rotational movement, the pivot bearing is nevertheless arranged in a sufficiently stable manner. By the pivot bearing being embodied at the rear end of the coupling rod, the pivoting movement of the coupling rod can be designed in a relatively simple manner. In one advantageous embodiment, a corresponding automatic guidance over the entire movement path of the door between the open position and the closed position is nevertheless made possible. In particular, with this embodiment of the pivot point of the coupling rod, a relatively short angular path about the axis of rotation is required in order to map this entire movement path of the door. This, too, is advantageous with regard to the required pivot forces.

It is preferably provided that a front end of the coupling rod viewed in the depthwise direction of the cooking appliance is coupled to the connecting rod oriented in the widthwise direction. This, too, advantageously supports the actuation concept for automatically retracting the door and thus moving the door into the stowage compartment and pushing the door out of the stowage compartment.

It is preferably provided that the coupling rod is pivotable in a horizontal plane between a pushed-out position and a pulled-in position. In the pushed-out position, the door is advantageously arranged in the closed position. In the pulled-in position, the door is arranged in particular in the open position and correspondingly arranged in its end position in the stowage compartment.

It is advantageously provided that the coupling rod is not oriented fully with its longitudinal axis in the depthwise direction in the pushed-out position. In particular, in this pushed-out position, this coupling rod is oriented with its longitudinal axis at an angle of less than 45° but greater than 0° relative to the depthwise direction, in particular between 20° and 45°. Such a basic position in the pushed-out position enables the pivoting movement into the pulled-in position to be achieved in an improved manner. In particular, less force thus has to be applied at the start of this pivoting movement if at the same time the door is to be pivoted from the closed position into the open position. It is advantageously provided that the coupling rod is oriented fully with its longitudinal axis in the widthwise direction in the pulled-in position. With this embodiment, the cooking appliance is designed compactly viewed in the depthwise direction when the door is pivoted into the stowage compartment. This is due in particular to the fact that there is no longer any need for a large space behind the door in the stowage compartment in order to be able to position the coupling rod in its pulled-in position there. The coupling rod is then effectively positioned directly behind the lower end of the door and is arranged extending in this widthwise direction.

In one advantageous embodiment, it is provided that the pivot range covered by the coupling rod between the two positions is greater than 30° and less than or equal to 90°, in particular between 30° and 60°. This is a very advantageous pivot range. As a result, on the one hand the pivot forces can be transmitted optimally to the connecting rod and in this regard a corresponding effectively linear movement achieved in the depthwise direction of the connecting rod and thus the door. On the other hand, a relatively large movement of the door is made possible by this relatively small angular interval. In particular, this relatively small pivot range of the coupling rod in a horizontal plane is associated with a relatively large pivot range of the door, namely 90° or essentially 90°.

It is preferably provided that the coupling rod has a carrier oriented in the heightwise direction of the cooking appliance. This carrier is in particular coupled directly to the connecting rod. With this embodiment, a relatively simple mechanical coupling principle between the coupling rod and the connecting rod is achieved. An undesired uncoupling during movement is thereby prevented.

In one advantageous embodiment, it is provided that the carrier is a vertical bar oriented in the heightwise direction. This is a particularly simple solution in terms of design. Furthermore, the coupling rod with the carrier has a correspondingly minimalistic structure. This minimizes both the space requirement and the weight embodiment of the coupling rod. Here, the vertical bar is oriented such that, when viewed in the depthwise direction, it engages behind the connecting rod on the side facing away from the rear end of the coupling rod via which the coupling rod is rotated.

It can also be provided that the connecting rod has a guide groove, in which the carrier is guided while being engaged therein. In particular, such a groove or guide track in the connecting rod can be embodied on an underside and be open toward the bottom.

In one advantageous embodiment, it is provided that the carrier is a U-shaped bracket which surrounds or receives the connecting rod. As a result, a more improved concept for secure coupling is achieved. A very continuous movement can also be achieved by the connecting rod being thus retained both to the front and to the rear by a limb of the U-shaped bracket in each case. In particular, in this context both the pulling of the door into the stowage compartment and the pushing of the door out of the stowage compartment can take place in an improved manner. During a corresponding movement, the respective limb of this carrier is then in particular that coupling bar which is in direct contact with the connecting rod and exerts the corresponding force onto the connecting rod.

In one advantageous embodiment, it is provided that the door-opening device has a drive unit or a motor. With this motor, the coupling rod can be rotated about its axis of rotation. In particular, the motor is arranged in the base assembly of the cooking appliance. It is preferably arranged below the base wall when viewed in the heightwise direction. As a result, a very space-saving concept is implemented. On the other hand, the stowage compartment is not unnecessarily restricted thereby.

It is preferably provided that the coupling rod is embodied in one piece. In particular, the coupling rod is embodied to be longitudinally stable when viewed in its longitudinal direction. In particular, it is also embodied to be rigid.

In one advantageous embodiment, it is provided that the coupling rod is embodied as a telescopic rod. In such an embodiment, the coupling rod is embodied such that its length can be reversibly modified in the direction of its longitudinal axis. It can be provided that such an embodiment of a coupling rod has two separate subrods, which can be displaced relative to one another in the direction of the longitudinal axis of the coupling rod. With such an embodiment, the movement transmission to the connecting rod during a pivoting movement in the horizontal plane of the coupling rod can be improved and thus the pivoting movement of the door improved. In particular, a movement guidance which is particularly free from jamming and jerking is made possible here. In this context, correspondingly jerk-free run-up movements can be made possible in particular at the ends of the entire movement path.

It is preferably provided that the motor of the door-opening device is arranged on the coupling rod and one of the two subrods can be displaced by the motor relative to the other subrod. In particular, in this context it can be provided that a corresponding coupling to the motor is made possible by way of a toothed device. For example, a subrod can be embodied at least partially as a toothed rod and the motor can have a further toothed rod or a toothed wheel which meshes with the toothed region of the subrod. Other concepts for the relative displacement of a subrod by the motor are however also possible. For example, tubular subrods which are guided into one another can also be embodied here. These can also be displaced relative to one another by hydraulic or pneumatic systems, for example.

In one advantageous embodiment, it is provided that the coupling rod has a length of between 350 mm and 550 mm, in particular between 400 mm and 500 mm. It can be provided that a diameter of the coupling rod measures between 8 mm and 18 mm. A corresponding stability of the coupling rod is thereby achieved.

A further aspect of the invention relates to a method for pivoting a door of a cooking appliance, in which the door, when being moved into the stowage compartment and/or out of the stowage compartment, is guided by a guide device of the cooking appliance. A guide runner of a guide carriage of a guide device of the cooking appliance is guided in a guide track, which is embodied in a wall delimiting the stowage compartment. The guide carriage is connected to the door and the guide runner is connected to a connecting rod of the guide carriage. The movement of the door is carried out automatically with a door-opening device of the cooking appliance at least in certain regions over an entire movement path measured between a closed and an open position of the door. A coupling rod of the door-opening device is on the one hand mechanically coupled directly to the connecting rod, so that relative movement between the coupling rod and the connecting rod is made possible. On the other hand, the coupling rod is mounted such that it can be rotated about an axis of rotation oriented in the heightwise direction so that, when the coupling rod is pivoted about the axis of rotation, the connecting rod is carried along in the depthwise direction of the cooking appliance. The advantages achievable thereby have already been explained in connection with the cooking appliance. Advantageous embodiments of the cooking appliance are to be regarded as advantageous embodiments of the method. In particular, to this end individual components or components which interact with one another are embodied such that the individual method steps are carried out. In particular, the coupling rod is pivoted here only in a horizontal plane, preferably in a pivot range between 40° and 90°. The direct coupling between the coupling rod and the connecting rod is implemented with a carrier.

A further aspect of the invention relates to a cooking appliance with a door for closing a cooking compartment, which door can be retracted into a housing of the cooking appliance. When being moved into the stowage compartment and out of the stowage compartment, the door is guided by a guide device of the cooking appliance. The cooking appliance has a guide device with at least one guide track in a wall which delimits the stowage compartment. A guide runner of a guide carriage of the guide device is guided in this guide track. Furthermore, the cooking appliance has a hinge. This hinge has an in particular U-shaped hinge arm or a hinge bracket. Two pulleys are preferably mounted rotatably on a limb of this U-shaped hinge arm. These engage into guide rails, which are embodied laterally on vertical side edges or over the height of the door and are open to the side. The cooking appliance has a door-opening device, with which the door can be moved automatically at least in certain regions over an entire movement path measured between a closed and an open position of the door. The door-opening device has a cable pull device. The cable pull device has a cable, which is connected directly to the hinge bracket. The other end of this cable is connected to a motor of the door-opening device. This motor is positioned in an upper component compartment, which is arranged above the muffle of the cooking appliance. In particular, this component compartment is embodied between a ceiling of the muffle and a ceiling wall of the housing of the cooking appliance. In particular, this motor is embodied with a claw coupling. In particular, the motor has a loose bearing and a fixed bearing. In particular, the motor also has a drive shaft. In particular, an electric motor is provided. A cable pulley which is connected to the drive shaft in a fixed manner is advantageously arranged on the motor. It is preferably provided that this motor-side cable pulley rolls the cable up and down. In particular, the door-opening device has a second cable pulley. This is in particular arranged such that it is mounted rotatably on the hinge. This cable pulley then serves as a deflection pulley for the cable. In particular, both cable pulleys are arranged in one plane, in particular in a vertical plane defined by the heightwise direction and the depthwise direction of the cooking appliance. In particular, this second cable pulley is arranged on a hinge housing, on which the U-shaped hinge bracket or hinge arm is also mounted in a pivotable manner. This hinge housing is preferably arranged in a base assembly of the cooking appliance. In particular, arranged on a side wall and/or a ceiling wall which delimit the stowage compartment of the retractable door. In particular, when viewed in the depthwise direction of the cooking appliance, the U-shaped hinge bracket is arranged at a front end of the hinge housing and the second cable pulley is arranged at a rear end. The first cable pulley preferably has a groove in which the cable is contained. This allows the cable to be rolled up and down cleanly.

The designations "above", "below", "in front", "behind", "horizontal", "vertical", "depthwise direction", "widthwise direction", "heightwise direction", etc. indicate positions and orientations during proper use and arrangement of the appliance.

Further features of the invention are disclosed in the claims, the figures and the description of the figures. The features and combinations of features mentioned in the description above and the features and combinations of features set out below in the description of the figures and/or shown in the figures alone are usable not only in the respective combination given, but also in other combinations or alone without departing from the scope of the invention. Embodiments of the invention which are not explicitly shown in the figures and described, but which arise and can be created through separate combinations of features from the embodiments described, are therefore also to be considered as included and disclosed. Embodiments and combinations of features can also be regarded as disclosed which therefore do not have all the features of an originally formulated independent claim.

BRIEF DESCRIPTION OF THE DRAWINGS

Exemplary embodiments of the invention will now be described in greater detail making reference to schematic drawings, in which.

DETAILED DESCRIPTION OF EXEMPLARY EMBODIMENTS OF THE PRESENT INVENTION

Figure 1:
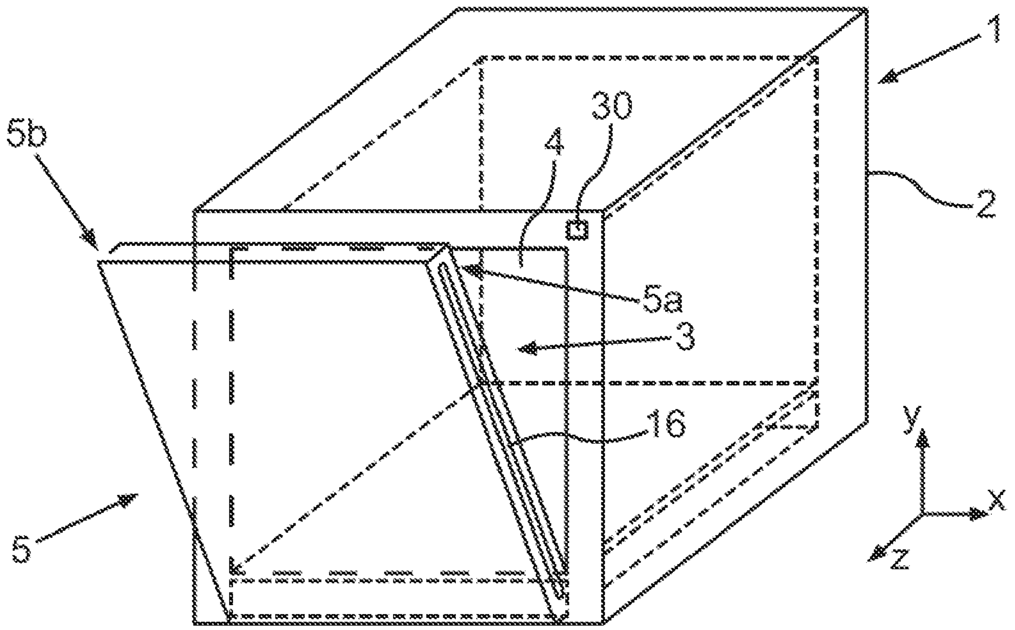
FIG. 1 shows a perspective representation of an exemplary embodiment of a cooking appliance according to the invention.

In the figures, the same or functionally identical elements are provided with the same reference characters.

FIG. 1 shows a schematic representation of a cooking appliance 1, which can be for example an oven or a microwave cooking appliance or a steam cooking appliance or corresponding combination appliance.

The cooking appliance 1 has a housing 2, in which a muffle 3 is arranged. With its walls, the muffle 3 delimits a cooking compartment 4. The cooking appliance 1 also has a door 5, which is arranged movably on the housing 2. In particular, the muffle 3 of the cooking appliance 1, which muffle delimits the cooking compartment 4 with its walls, is also to be considered part of the housing 2. The door 5 can therefore be arranged on the muffle 3. The door 5 is arranged such that it closes the cooking compartment 4 on the front side.

Furthermore, the cooking appliance 1 has a stowage compartment 6 which is separate to the cooking compartment 4 and thus from the cooking compartment 4. This stowage compartment 6 is embodied below the cooking compartment 4 in the heightwise direction (y direction). The stowage compartment 6 is embodied to receive the door 5 in the open state of the door 5. The door 5 can be retracted into the stowage compartment 6 in the open state.

Figure 2:
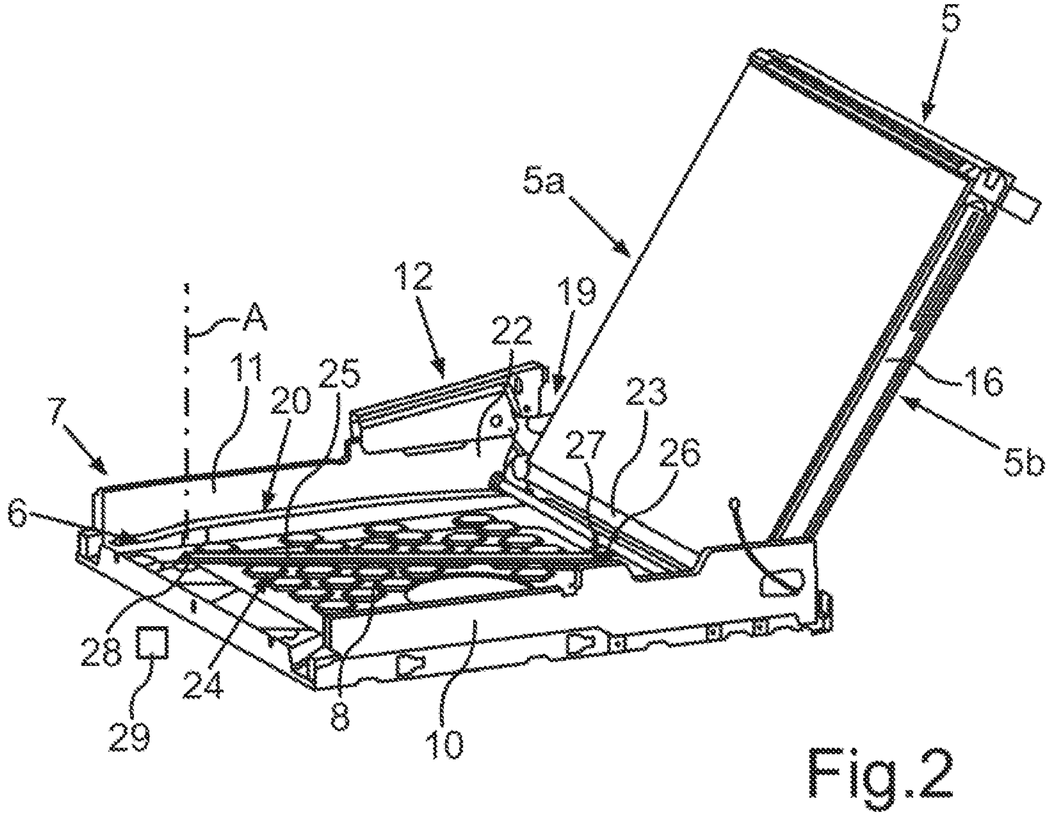
FIG. 2 shows a perspective representation of subcomponents of a base assembly of the cooking appliance according to FIG. 1 and a door of the cooking appliance according to FIG. 1 in a partially open position.

FIG. 2 shows a perspective representation of an exemplary embodiment of a base assembly 7 of the cooking appliance 1 with a door 5 arranged thereon. The stowage compartment 6 is shown here in the base assembly 7, which stowage compartment is delimited by a base 8, a ceiling wall 9 (FIG. 4) and side walls 10 and 11. For the sake of clarity, the ceiling wall 9 is not shown in FIG. 2.

Figure 3:
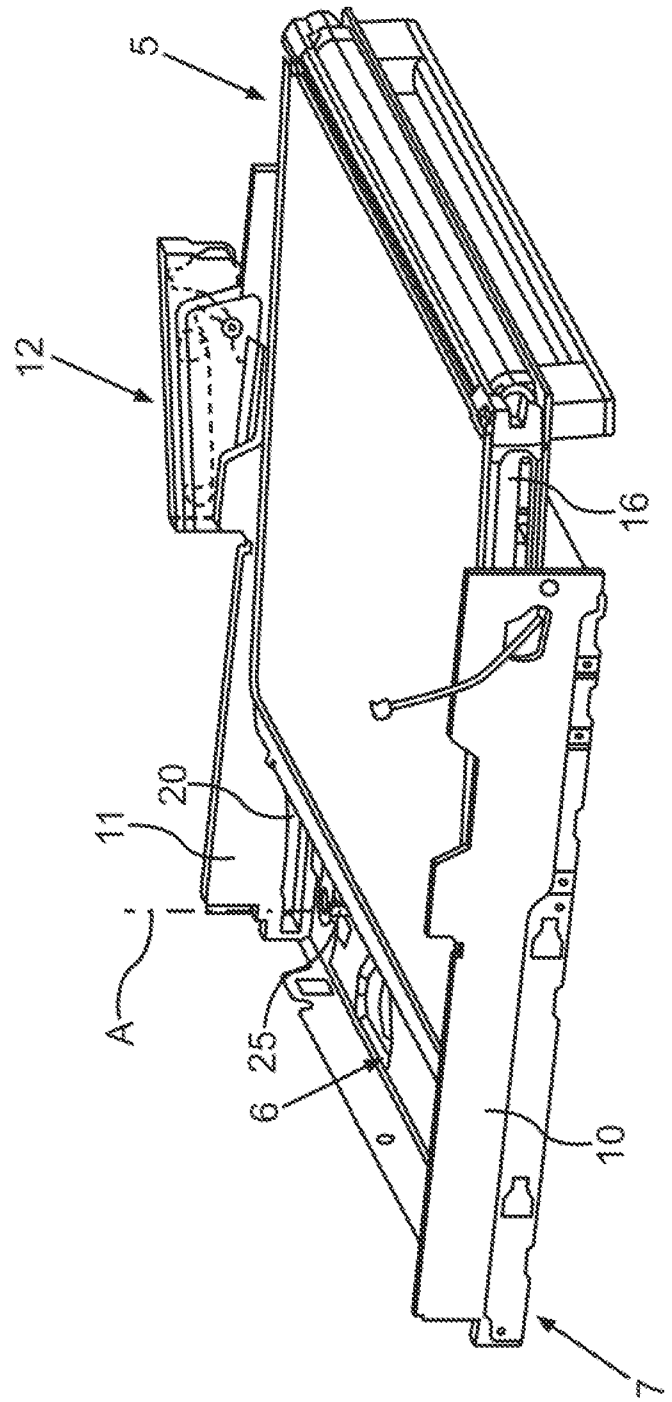
FIG. 3 shows a perspective representation of the components according to FIG. 2 with the door in an almost fully open position.

FIG. 2 shows opposite hinges 12 and 13 (not shown in FIG. 2), which are arranged such that they sit on top of the side walls 10 and 11. The hinges 12 and 13 are embodied with an identical design, so that the explanation below is given only for hinge 12. Said hinge has a hinge housing 14 (FIG. 4) and a hinge bracket 15 arranged rotatably thereon. Here, the hinge bracket 15 is embodied in particular to be U-shaped. The hinge bracket 15 is coupled to the door 5. To this end, the door 5 has guide tracks, of which one guide track 16 is shown in FIGS. 2 and 3, which are disposed on opposite vertical side edges 5*a*, 5*b* (FIG. 1) and are open to the side. Pulleys 17 and 18 (FIG. 4), which are arranged rotatably on the hinge bracket 15, engage into this guide track 16.

The door 5 is shown in an intermediate position between the closed position and the fully open position. The cooking appliance 1 has a guide device 19. With this guide device 19, the door 5 is guided in the base assembly 7 between the closed position and the open position or between the open position and the closed position. The guide device 19 has a guide track 20. The guide track 20 is embodied in the side wall 11. A corresponding guide track is embodied on the opposite side wall 10. Furthermore, the guide device 19 has a guide carriage 21. The guide carriage 21 has a guide runner 22 and a connecting rod 23. The connecting rod 23 connects two separate guide runners 22 of the guide carriage 21, which are disposed opposite one another. The guide runner 22 is guided in the guide track 20. A further, opposite guide runner 22 is guided in the guide track of the side wall 12. The guide carriage 21 is separated from the hinges 12 and 13. The hinges 12 and 13 are correspondingly arranged in a fixed position on the base assembly 7. The guide carriage 21, on the other hand, is displaceable in the base assembly 7 in the depthwise direction (z direction).

The guide carriage 21 is arranged below the hinges 12 and 13 in the heightwise direction.

Furthermore, the cooking appliance 1 has a door-opening device 24. The door-opening device 24 has a coupling rod 25. The coupling rod 25 is mechanically coupled at its front first end 26 to the connecting rod 23. In particular, the coupling rod 25 has a carrier 27 at this end 26. Said carrier can be a vertical bar. The carrier 27 is preferably embodied as a U-shaped bracket. This surrounds the connecting rod 23. This coupling rod 25 is mounted rotatably on an opposite rear end 28. An axis of rotation A is oriented in the heightwise direction. The pivot bearing is correspondingly arranged in a fixed position when viewed as a whole. Furthermore, the door-opening device 24 has a motor 29, which is shown only symbolically in FIG. 2. In particular, said motor is arranged below the stowage compartment 6. In particular, it is arranged below the base 8.

The coupling rod 25 extends in a horizontal plane. This is also embodied over the entire pivot path of the coupling rod 25.

If the door 5 is opened starting from its closed position, this takes place at least partially, in particular fully automatically over its entire movement path by way of the door-opening device 24.

For example, the door-opening movement can be started by actuating the control element 30 (FIG. 1). The control element 30 can be embodied on the housing 2 or on the door 5 itself.

During this automatic movement, a pivoting movement of the coupling rod 25 about the axis of rotation A is initiated by the motor 29. As a result, the coupling rod 25 is displaced relative to the connecting rod 23 with its front end 26 in this widthwise direction. The pivoting movement then causes the connecting rod 23 to be drawn backward in the depthwise direction. In FIG. 2, which shows an intermediate position of the door 5, the connecting rod 23 has correspondingly already traveled a certain path backward in the depthwise direction. When the coupling rod 25 is pivoted further in the clockwise direction, the connecting rod 23 is also drawn further backward and the door 5 coupled directly thereto is also drawn into the stowage compartment 6.

FIG. 3 shows the corresponding component arrangement as shown in FIG. 2 and the door 5 in an intermediate position having been moved further into the stowage compartment 6. For the sake of clarity, the ceiling wall 9 is not shown in FIG. 2 and FIG. 3.

Figure 4:
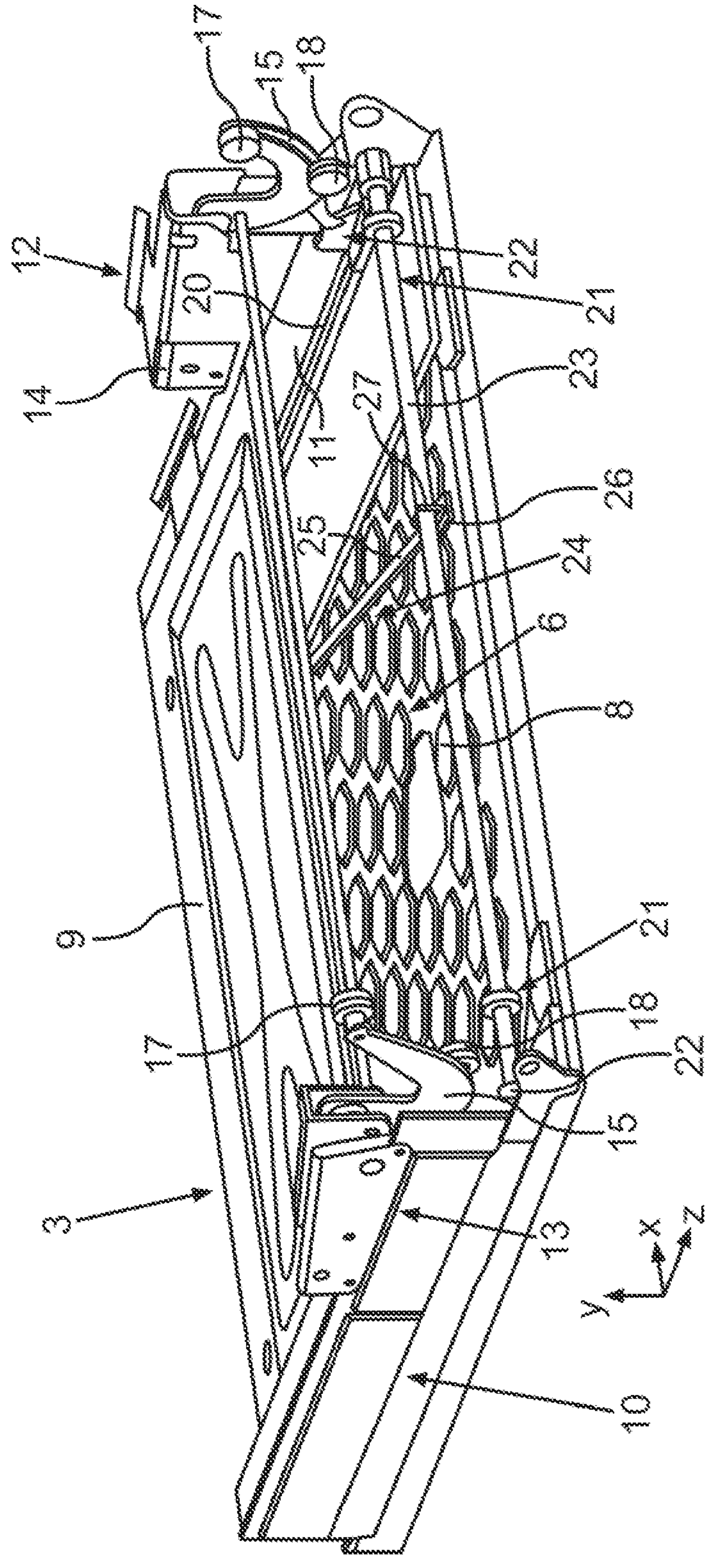
FIG. 4 shows a perspective partial representation of a base assembly of the cooking appliance according to FIG. 1.

FIG. 4 shows a perspective representation of the base assembly 7 when viewed from the front side. The door 5 is not shown here.

Figure 5:
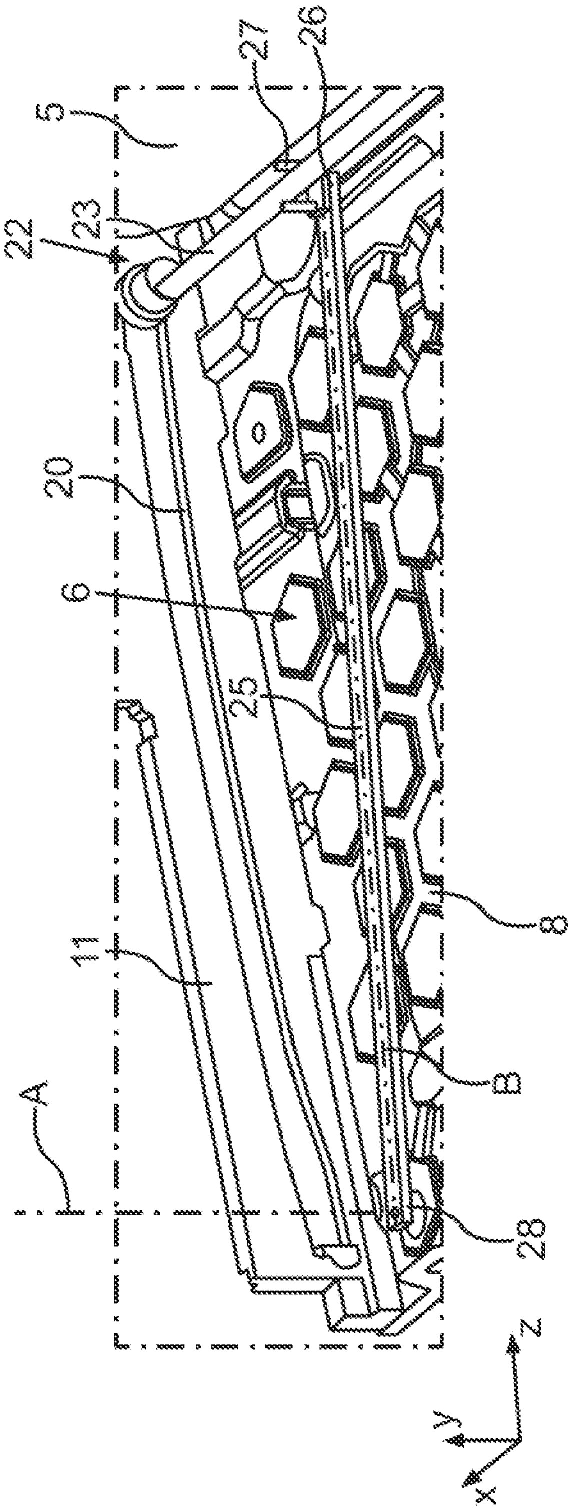
FIG. 5 shows a partial representation of the base assembly according to FIG. 4 with a coupling rod of a door-opening device and a connecting rod of a guide device, wherein the door is arranged here in the closed state.
Figure 6:
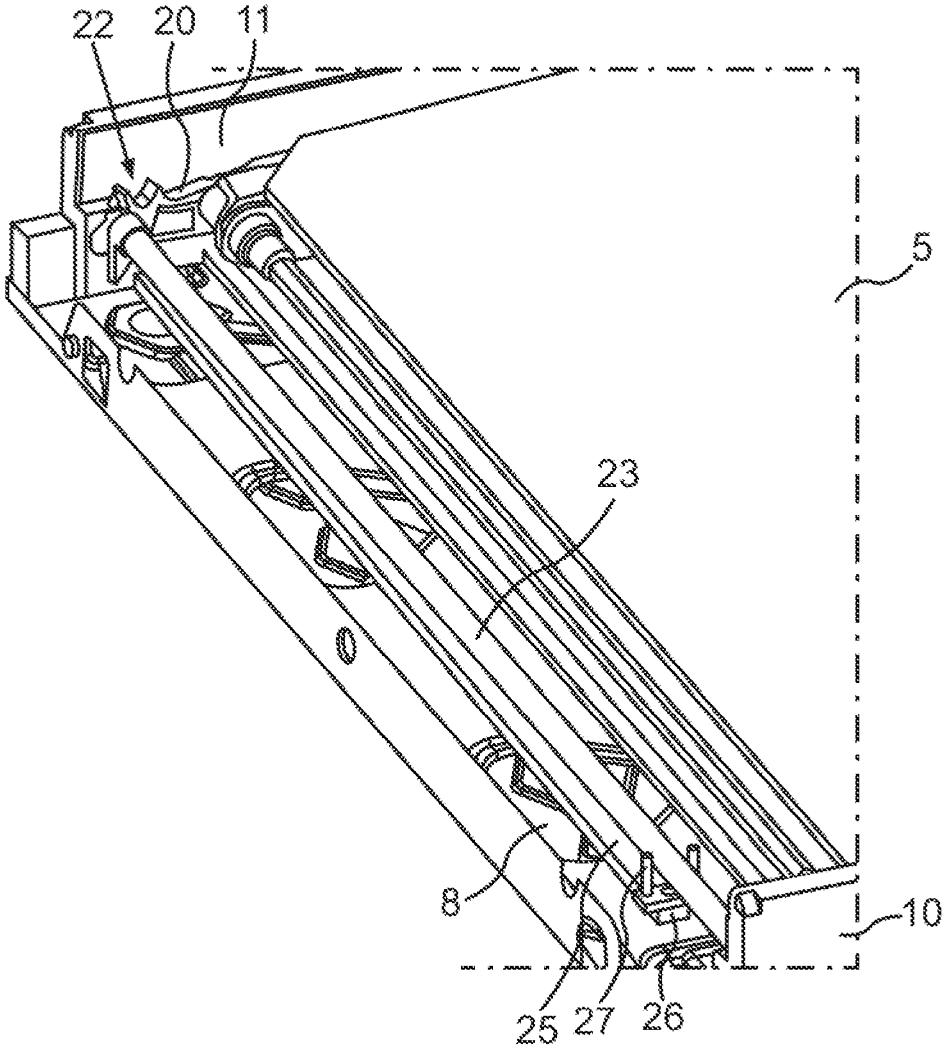
FIG. 6 shows a partial representation of the base assembly with a door, which is arranged in the closed end position and is thus arranged such that it is retracted in the stowage compartment.

FIG. 5 shows a partial representation of the base assembly 7, wherein the ceiling wall 9 is removed. The position of the coupling rod 25 assumed when the door 5 is arranged in the closed state is shown here. It can be seen that the coupling rod 25 is oriented in the horizontal plane with its longitudinal axis B at an angle greater than 0°, in particular greater than 15°, and less than 45° to the depthwise direction (z direction). If, as already explained above, the door 5 is now opened and pivoted into the stowage compartment 6, this movement path takes place automatically, guided by the door-opening device 24. In this context, FIG. 6 shows a perspective representation of subcomponents, wherein the end position of the door 5 in the stowage compartment 6 is shown here. In this state, the coupling rod 25 is oriented fully in the widthwise direction and arranged in the depthwise direction behind the door 5 in the stowage compartment 6. The connecting rod 23 arranged above the coupling rod 25 in the heightwise direction is also arranged in the widthwise direction. In this position, the coupling rod 25 and the connecting rod 23 are positioned practically one above the other and extending in the same direction, namely in the widthwise direction. As can be seen here, the carrier 27 is arranged such that it is movable relative to the coupling rod 25 at this front end 26, in particular mounted thereon such that it can be rotated about an axis of rotation oriented in the heightwise direction.

Figure 7:
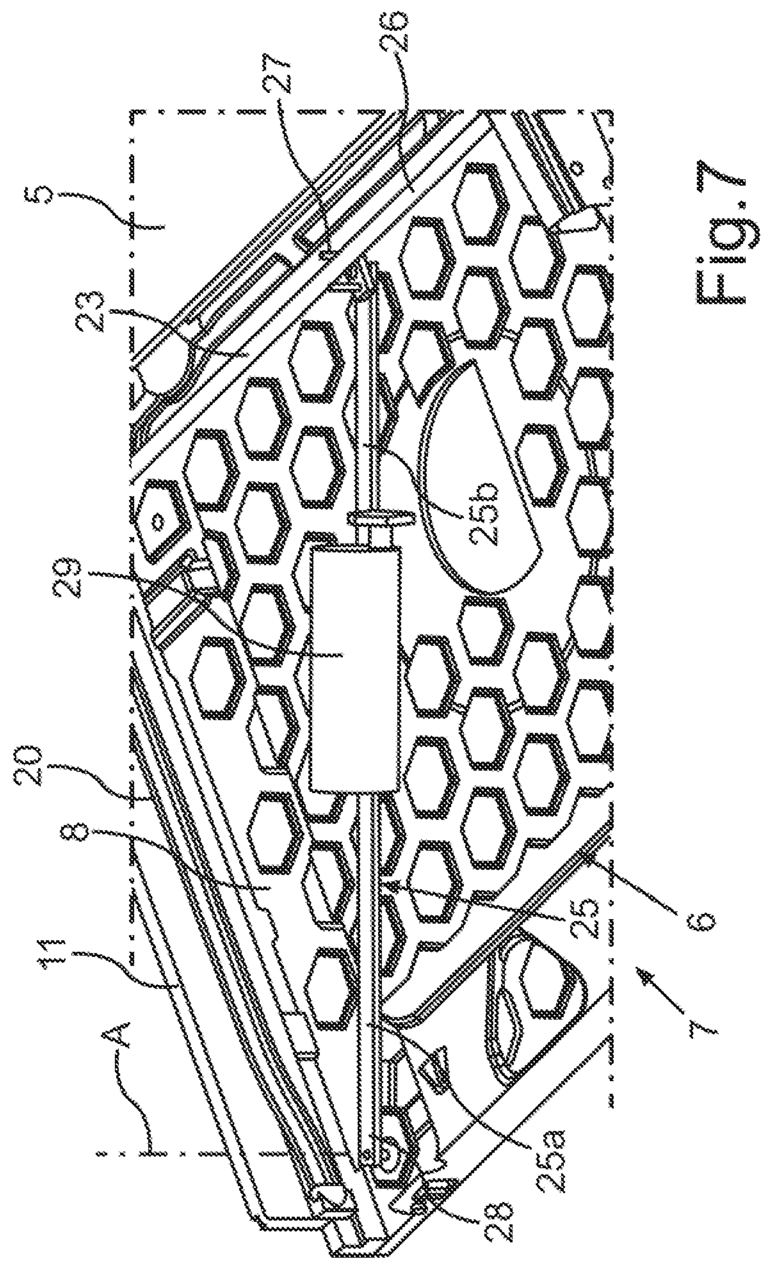
FIG. 7 shows a representation of subcomponents of a base assembly of the cooking appliance with a further exemplary embodiment of a door-opening device.

FIG. 7 shows a perspective plan view of a further exemplary embodiment. This embodiment differs from the embodiment explained above in that the coupling rod 25 is formed not from a one-piece, fixed-length rod but instead from two subelements. Provision is made for a first subrod 25*a* and a second subrod 25*b* separate thereto, which is displaceable relative to the first subrod 25*a* in the direction of the longitudinal axis B. Here, the motor 29 is preferably arranged directly on the coupling rod 25. This motor 29 causes the axial relative displacement of the two subrods 25*a* and 25*b*. This change of length in turn causes a rotational movement of the entire coupling rod 25 about the axis of rotation A. This is because, with this change of length, for example when the coupling rod 25 is pulled together, the connecting rod 23 is drawn linearly backward in the depthwise direction and, on account of the mechanical operating principle in which the coupling rod 25 is oriented at a 90° angle to the connecting rod 23, the connecting rod 23 is drawn backward and the coupling rod 25 rotated about the axis of rotation A. When the connecting rod is pushed out of the stowage compartment 6 by the increase in length of the coupling rod 25 which has now taken place, the connecting rod 23 is pushed linearly forward in the depthwise direction and, as a result, a pivoting of the coupling rod about the axis of rotation A is in turn initiated.

Figure 8:
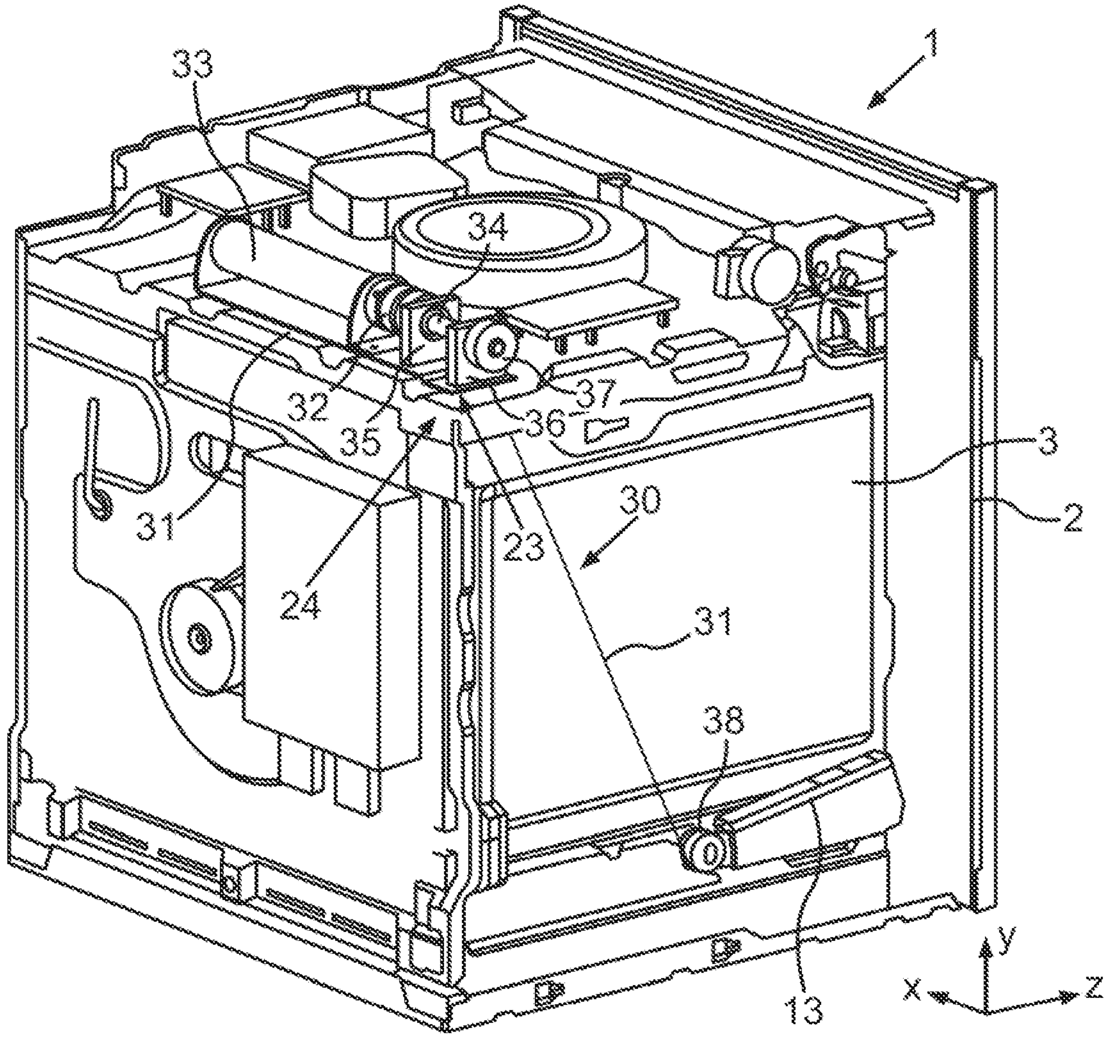
FIG. 8 shows a perspective representation of the cooking appliance with a further exemplary embodiment of a door-opening device.
Figure 9:
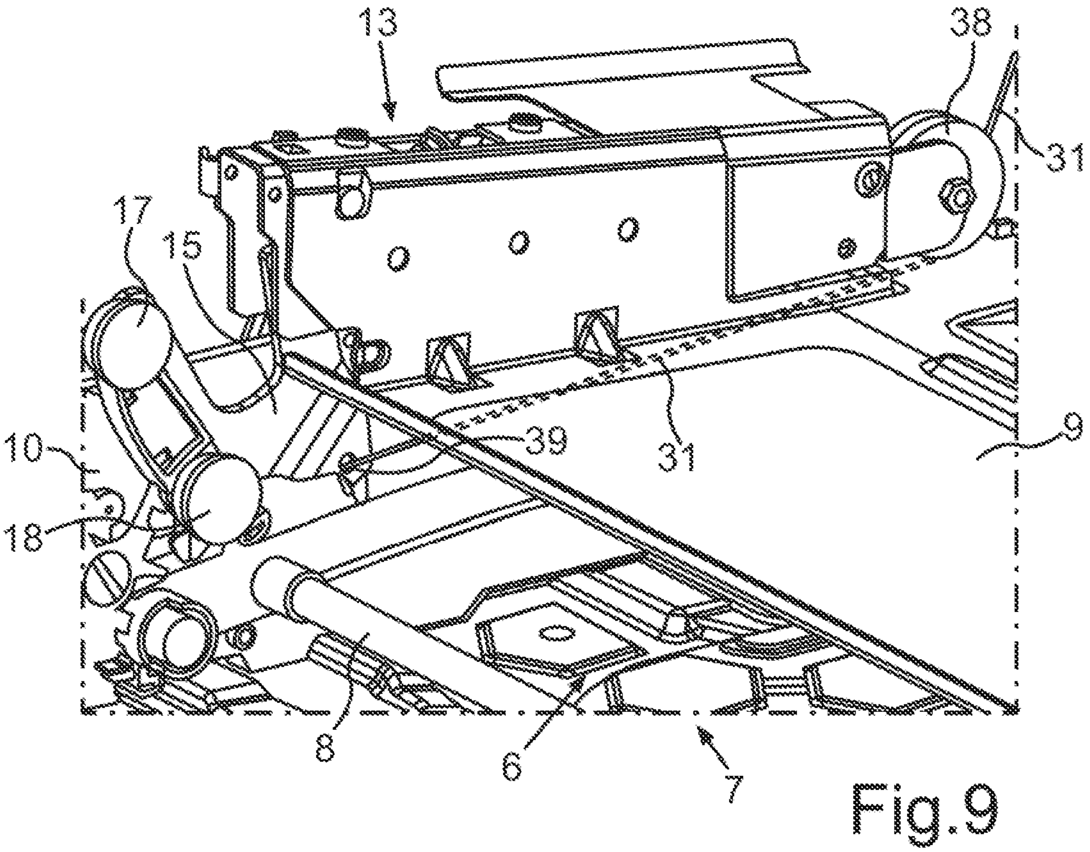
FIG. 9 shows a perspective representation of subcomponents of the door-opening device according to FIG. 8.

FIG. 8 shows a perspective representation of a further exemplary embodiment of a cooking appliance 1. In this embodiment, it is provided that the door-opening device 24 has a cable pull device 30. This cable pull device 30 has a cable 31. Furthermore, the cable pull device 30 has a motor 31. This motor 31 is arranged in a above the receiving compartment or the cooking compartment 4 and above the muffle 3 in the heightwise direction. To this end, a component compartment is embodied between the ceiling of the muffle 3 and the ceiling of the housing 2. The motor 31 has a claw coupling 32. It has an electric motor 33. Furthermore, a drive shaft 34 is provided. Moreover, a loose bearing 35 and a fixed bearing 36 separate thereto are embodied. Furthermore, a first cable pulley 37 is provided, which is connected to the drive shaft 34. The cable 31 is fastened to this first cable pulley 37 and is rolled down or up as a function of the rotational movement of the first cable pulley 37. Moreover, the cable pull device 30 has a second cable pulley 38. This arranged on the hinge 13. In particular, it is arranged in the depthwise direction on a rear end of the hinge housing of the hinge 13 such that it is mounted in a rotatable manner. The second cable pulley 38 is a cable deflection pulley. The cable 31 is deflected thereby. The cable 31 is connected directly to the U-shaped hinge bracket 15, as shown in FIG. 9. To this end, the hinge bracket 15 has a receptacle 39 in which the cable 31 is fastened.

Figure 10:
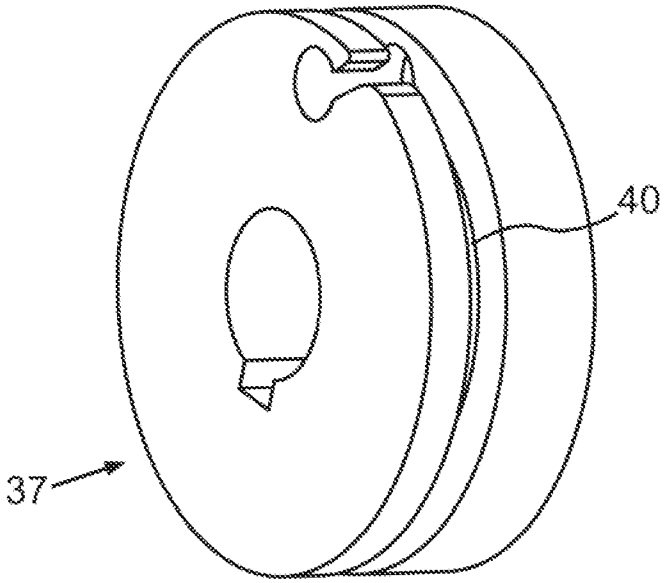
FIG. 10 shows a perspective representation of a cable pulley as a component of the door-opening device according to FIG. 8 and FIG. 9.

FIG. 10 shows a perspective representation of the first cable pulley 37. It has a groove 40. The cable 31 is guided in this groove 40.

The invention claimed is:

1. A cooking appliance, comprising;

a housing delimiting a stowage compartment;

a door for closing a cooking compartment, said door designed for retraction into the stowage compartment;

a guide device designed to guide the door when being moved into the stowage compartment or out of the stowage compartment, said guide device including a guide track in a wall which delimits the stowage compartment, and a guide carriage connected to the door and including a guide runner guided in the guide track and connected to a connecting rod of the guide carriage; and a door-opening device for automatic movement of the door at least in one region over an entire movement path measured between a closed position and an open position of the door, said door-opening device including a coupling rod which is mechanically coupled directly to the connecting rod such as to permit a relative movement between the coupling rod and the connecting rod, and which is mounted for rotation about an axis of rotation oriented in a heightwise direction so that, when the coupling rod is pivoted about the axis of rotation, the connecting rod is carried along in a depthwise direction of the cooking appliance, wherein the coupling rod includes a carrier which is oriented in the heightwise direction and is coupled directly to the connecting rod, and the carrier includes a vertical bar.

2. The cooking appliance of claim 1, further comprising a base designed to delimit the stowage compartment, said coupling rod having in the depthwise direction a rear end mounted rotatably to the base.

3. The cooking appliance of claim 1, wherein the coupling rod has a front end in the depthwise direction, said front end of the coupling rod being coupled to the connecting rod which is oriented in a widthwise direction.

4. The cooking appliance of claim 1, wherein the coupling rod is pivotable about the axis of rotation in a horizontal plane between a pushed-out position and a pulled-in position.

5. The cooking appliance of claim 4, wherein the coupling rod is pivotable between the pushed-out position and the pulled-in position via a pivot range which is greater than 30° and less than or equal to 90°.

6. The cooking appliance of claim 1, wherein the door-opening device includes a motor, with which the coupling rod is rotatable about its axis of rotation.

7. The cooking appliance of claim 6, further comprising a base designed to delimit the stowage compartment, said motor being arranged under the base and outside of the stowage compartment.

8. The cooking appliance of claim 1, wherein the coupling rod is embodied in one piece and in a longitudinally stable manner.

9. The cooking appliance of claim 1, wherein the coupling rod is embodied as a telescopic rod including two subrods which are displaceable relative to one another.

10. The cooking appliance of claim 9, wherein the door-opening device includes a motor arranged on the coupling rod, one of the two subrods being displaceable relative to the other one of the two subrods by the motor.

11. The cooking appliance of claim 1, wherein the coupling rod has a length between 350 mm and 550 mm and/or a diameter between 8 mm and 18 mm.

12. The cooking appliance of claim 1, wherein the coupling rod has a length 400 mm and 500 mm.

13. A method for pivoting a door of a cooking appliance, said method comprising:

connecting a guide carriage to a door of the cooking appliance;

connecting a guide runner of the guide carriage to a connecting rod of the guide carriage;

mechanically coupling a coupling rod of a door-opening device directly to the connecting rod via a U-shaped bracket carrier directly coupled to and surrounding the connecting rod and oriented in the heightwise direction such as to enable a relative movement between the coupling rod and the connecting rod and mounting the coupling rod for rotation about an axis of rotation oriented in a heightwise direction of the cooking appliance so that, when the coupling rod is pivoted about the axis of rotation, the connecting rod is carried along in a depthwise direction of the cooking appliance, thereby allowing the door-opening device to automatically move the door between closed and open positions, as the door is guided during movement into a stowage compartment or out of the stowage compartment via the guide runner in a guide track, which is embodied in a wall delimiting the stowage compartment.

14. A cooking appliance, comprising;

a housing delimiting a stowage compartment;

a door for closing a cooking compartment, said door designed for retraction into the stowage compartment;

a guide device designed to guide the door when being moved into the stowage compartment or out of the stowage compartment, said guide device including a guide track in a wall which delimits the stowage compartment, and a guide carriage connected to the door and including a guide runner guided in the guide track and connected to a connecting rod of the guide carriage; and a door-opening device for automatic movement of the door at least in one region over an entire movement path measured between a closed position and an open position of the door, said door-opening device including a coupling rod which is mechanically coupled directly to the connecting rod such as to permit a relative movement between the coupling rod and the connecting rod, and which is mounted for rotation about an axis of rotation oriented in a heightwise direction so that, when the coupling rod is pivoted about the axis of rotation, the connecting rod is carried along in a depthwise direction of the cooking appliance, wherein the coupling rod includes a carrier which is oriented in the heightwise direction and is coupled directly to the connecting rod, and the carrier is a U-shaped bracket which surrounds the connecting rod.

* * * * *